United States Patent [19]

Rabinow

[11] Patent Number: 5,269,193
[45] Date of Patent: Dec. 14, 1993

[54] SWASH PLATE MECHANISM

[76] Inventor: Jacob Rabinow, 6920 Selkirk Dr., Bethesda, Md. 20817

[21] Appl. No.: 933,100

[22] Filed: Aug. 21, 1992

[51] Int. Cl.⁵ ............................................. F16H 23/10
[52] U.S. Cl. ........................................... 74/60; 92/71; 123/58 BB; 417/269
[58] Field of Search ...................... 74/60; 123/58 BB; 91/499; 92/71; 417/269

[56] References Cited

U.S. PATENT DOCUMENTS

| | | | |
|---|---|---|---|
| 1,370,927 | 3/1921 | Staude | 74/60 X |
| 1,610,060 | 12/1926 | Lind | 123/50 BB |
| 1,679,924 | 8/1928 | Almen | 74/60 X |
| 1,877,285 | 9/1932 | Eckels | 74/60 X |
| 1,978,762 | 10/1934 | Reagan | 74/60 |
| 2,206,871 | 7/1940 | Berry | 74/60 |
| 2,543,584 | 2/1951 | Meinecke | 74/60 X |
| 2,877,653 | 3/1959 | Masnik et al. | 74/60 |
| 3,006,324 | 10/1961 | Shaw | 74/60 |
| 3,528,394 | 9/1970 | Cummins | 123/58 BC |
| 4,285,303 | 8/1981 | Leach | 123/58 BC X |
| 4,497,284 | 2/1985 | Schramm | 123/58 B X |

OTHER PUBLICATIONS

Some Unusual Engines by LJK Setright-17 pages (Prior Aug./ 1992).

Primary Examiner—Allan D. Herrmann
Attorney, Agent, or Firm—William D. Hall

[57] ABSTRACT

A swash plate mechanism, for coverting linear motion into notary motion and vice versa is disclosed, which overcomes the main difficulties with older arrangements of swash plate drives. These are the high friction of most drives or the high complexity of efforts to overcome the friction effects. The mechanism of this invention permits the application of low friction bearings like ball bearings, in all of the rotating or sliding joints of the machine, except for the pistons, and their cylinders. The mechanisms described can be used in engines or in pumps with equal ease. The swash plate system disclosed, for example, has two spaced swash plates, rotating on a common shaft. A driving plate, which does not rotate, is positioned-between the swash plates and contacts each of the swash plates via ball or roller bearings. When the machine is used to convert the lateral motion of elements, like pistons, to rotary motion of an engine shaft, the pistons are coupled to the drive plate and make the drive plate wobble so as to cause the swash plates to rotate the shaft. When the machine is used to covert rotary motion to linear motion, the prime mover rotates the shaft causing the swash plates to wobble the plate between there which, in turn, causes the pistons or other elements of the total machine to move laterally.

13 Claims, 3 Drawing Sheets

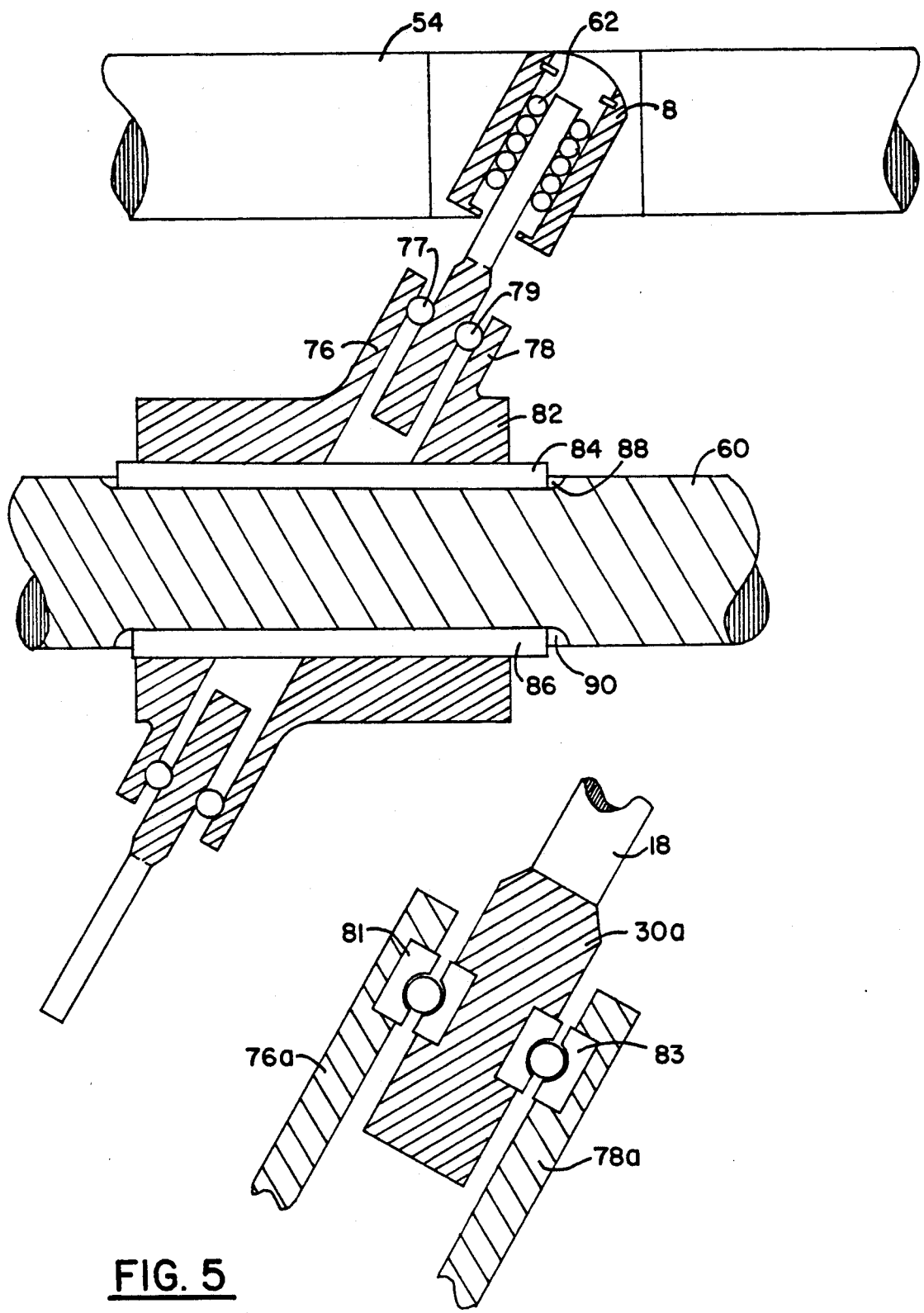

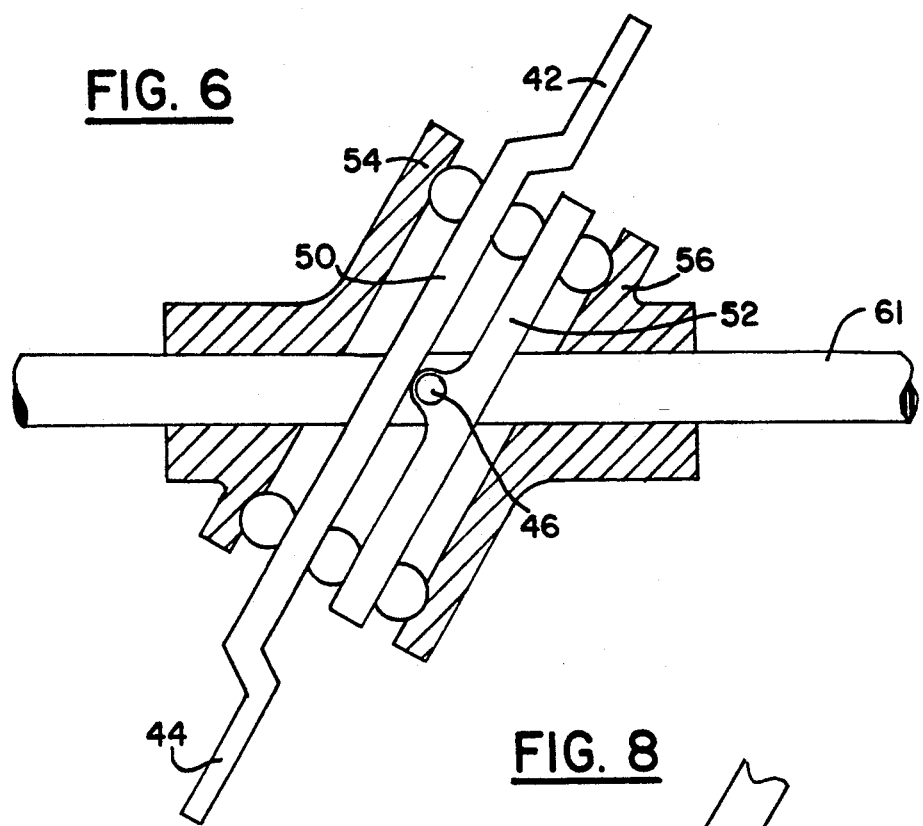
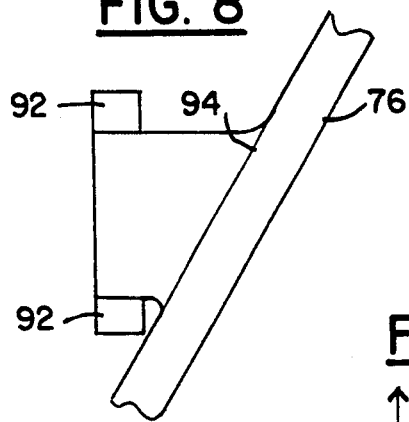
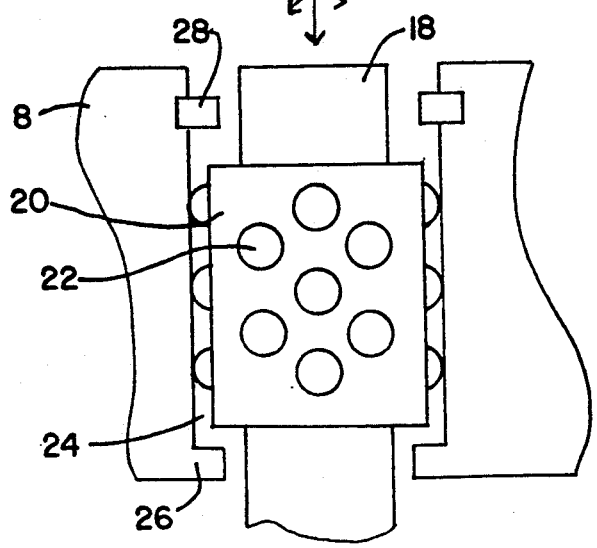

SWASH PLATE MECHANISM

BACKGROUND OF THE INVENTION

The appeal of the use of one or more swash plates has produced many designs and the building of many models. For example, see the chapter entitled "Engines with Unusual Translation of Power" in the book by LJK Setright entitled "Some Unusual Engines" published by Mechanical Engineering Publications Limited, London." In that chapter it is stated: "It is an arrangement that has charmed designers for many years because it is blessedly compact, with the cylinders of the engine arranged in the same way as are the chambers of a revolver. With an output shaft at the center of the cylinder block, all that is needed to link it to the pistons is a swash palte or wobble plate. Could anything be simpler or more obvious?"

The apparent simplicity of the swash plate and the compactness of a possible engine or a pump is the main attraction. This is particularly true of multiple cylinder machines.

A basic machine can be seen in U.S. Pat. No. 3,006,324 where the centrally located swash plate is driven by half-spheres which, in turn, are driven by opposed pistons. Consider what happens when the shaft rotates, for example, at 4000 RPM. One side of each driving element must rub against the swash plate, and the other, spherical side of each element must rotate in its concave spherical seat. Such design, obviously leads to low efficiency and short life.

A major effort to overcome the high speed friction of a simple swash plate is exemplified by U.S. Pat. No. 2,877,653 where the swash plate is replaced by a Z shaped drive shaft that is coupled by a set of ball bearings to a driving plate. This plate no longer revolves but is wobbled by ball and socket devices that are driven by the pistons. Again, as in the previously mentioned example, the ball and socket devices must not only slide on the shafts of the driving plate, but must slide radially against the extensions of the cylinders.

Another attempt to reduce the frictions inherent in many swash plate designs can be seen in Reagan, U.S. Pat. No. 1,978,762. Here the usual swash plate is divided into two opposing swash plates between which is located a single flat drive plate, coupled to the two swash plates by a ball bearing assembly. While this reduces the friction between these elements, the outer rim of the drive plate is coupled by friction means to sliding pistons. This friction means consist of hemispheres that contact the drive plate on their flat inner surfaces. The frictional contact between those hemispheres and the sliding pistons as well as the frictional contact between the drive plate and the inner walls of the hemispheres produce the wear that has plagued swash plate machines for decades.

In order to overcome the sliding frictions of the driving joints of the machine such as is mentioned in U.S. Pat. No. 2,877,653 connecting rods were introduced between the pistons and the non rotating drivers of the Z shafts as exemplified in U.S Pat. Nos. 3,528,394 and 4,497,284. This solution eliminates some sliding joints but requires that the connecting rods have ball-and-socket joints at both ends, or a ball and socket at one end and a universal joint at the other end of each connecting rod. This type of construction gives rise to another difficulty. There is now no mechanism to keep the driving plate from rotating because the connecting rods do not constrain the plate from rotation. In U.S. Pat. No. 3,528,394 the two driving plates have extension pins (28 in FIG. 1) that ride in guides (29) formed in the frame of the machine so as to keep the plates from turning. Such construction leads to noise and rapid wear. Such a sliding anti-rotation device can be seen at 13 in FIG. 1 of U.S. Pat. No. 1,370,927.

Now, I come to another problem that has plagued designers of swash plate machines that do not use double hinged connecting rods. If a driving plate is driven by a ball joint such as shown in U.S. Pat. No. 1,610,060 or in U.S. Pat. No. 4,285,303, one of the ball joints can have a linear motion when driven by one or two opposed pistons. By "linear," I mean in a plane passing through the center line of the main shaft. The ball joint on the opposite side of the machine, that is where there are two (or two sets of opposed pistons), also move in a linear motion in a plane parallel to the main shaft. However, the ball joints 90% to these two no longer can move in such a linear modes without sliding in some way on the driving plate. For this reason in U.S. Pat. No. 4,285,303 the inventor shows sliding freedom between plate 23 and ball joint 51 in FIG. 7, and the same arrangement in FIG. 8. In FIG. 3 of U.S. Pat. No. 1,610,060 we see a similar solution provided by looseness between the ball joint assemblies 10 and circular spaces 9 in FIG. 3.

The expedients just mentioned provide undetermined motion and provide violent impacts, noise and rapid wear at these areas.

An interesting method of holding the driving plate from turning but permitting it to wobble is shown in U.S. Pat. No. 4,497,284. Here the plate is mounted on a bearing in a gimbal ring and the gimbal ring is mounted on a bearing in the machine case. The machine connecting rods as is done in others.

Two sets of opposed pistons, spaced 180° apart in a swash plate machine do not have the problem described above but the chance to employ more cylinders, particularly eight, is highly desirable.

It should be noted that in all of the patents that I have studied, friction between sliding components exists in several places, and it is not surprising that so far no swash plate internal combustion engine has been commercially successful.

SUMMARY OF THE INVENTION

In this application I use the words "swash plate" as an inclined plate that revolves with the central shaft. I shall use the words "drive plate" to describe a wobbling plate that does not rotate.

In this application I am concerned only with the swash plate mechanism. This mechanism can be used with internal combustion engines of four cycle or two-cycle types. The mechanism can be used with one or more cylinders, up to eight. The basic theories explained in this application can also be extended to more than eight cylinders, but at slightly greater complexity. The mechanism can be used for pumps. Here the central shaft is rotated by outside power and the mechanism can drive the pistons. While I shall discuss the idea of a single swash unit of the machine located between opposed pistons, the invention can also be applied to a double ended machine with centrally located cylinders and pistons such as is shown in either U.S. Pat. No. 3,528,394 or U.S. Pat. No. 4,285,303.

There are two basic features of my mechanism. One is to couple the linear components that drive, or are driven by, the swash plate assembly by means of anti-friction bearings. This is particularly important because these coupling experience very large forces, large motions and a great many cycles during their life times.

The second feature of my invention is that the basic design is suitable for use with an appreciable number of cylinders. By splitting the usual swash plate into two opposing plates, I can use one central plate to co-operate with up to four pistons, and two central wobble plates to co-operate with up to eight pistons. This can be done with low friction and high efficiency with my invention.

The driving plate, or plates, have arm projections that are coupled to the pistons by linear and rotating bearings as will be described shortly. The arrangement is such that coupling between the pistons and the driving plates produces linear motions and the driving plates need no other mechanism to keep them from rotating.

DETAILED DESCRIPTION

FIG. 2 shows a more detailed view of the embodiment of FIG. 1.

FIG. 5 shows the arrangement if ball bearings are used with their own ball-bearing races.

FIG. 6 shows the arrangement of two driving plates for use with more than four pistons.

FIG. 7 shows the undesirable path of a right angle driving arm that prevents the use of one driving plate for more than four pistons.

FIG. 8 shows the design of one of the swash plates and the possible locations of balancing masses to produce dynamic balance.

FIG. 9 shows the design of a ball bearing that permits a shaft to move axially and also to rotate.

Figure 1:
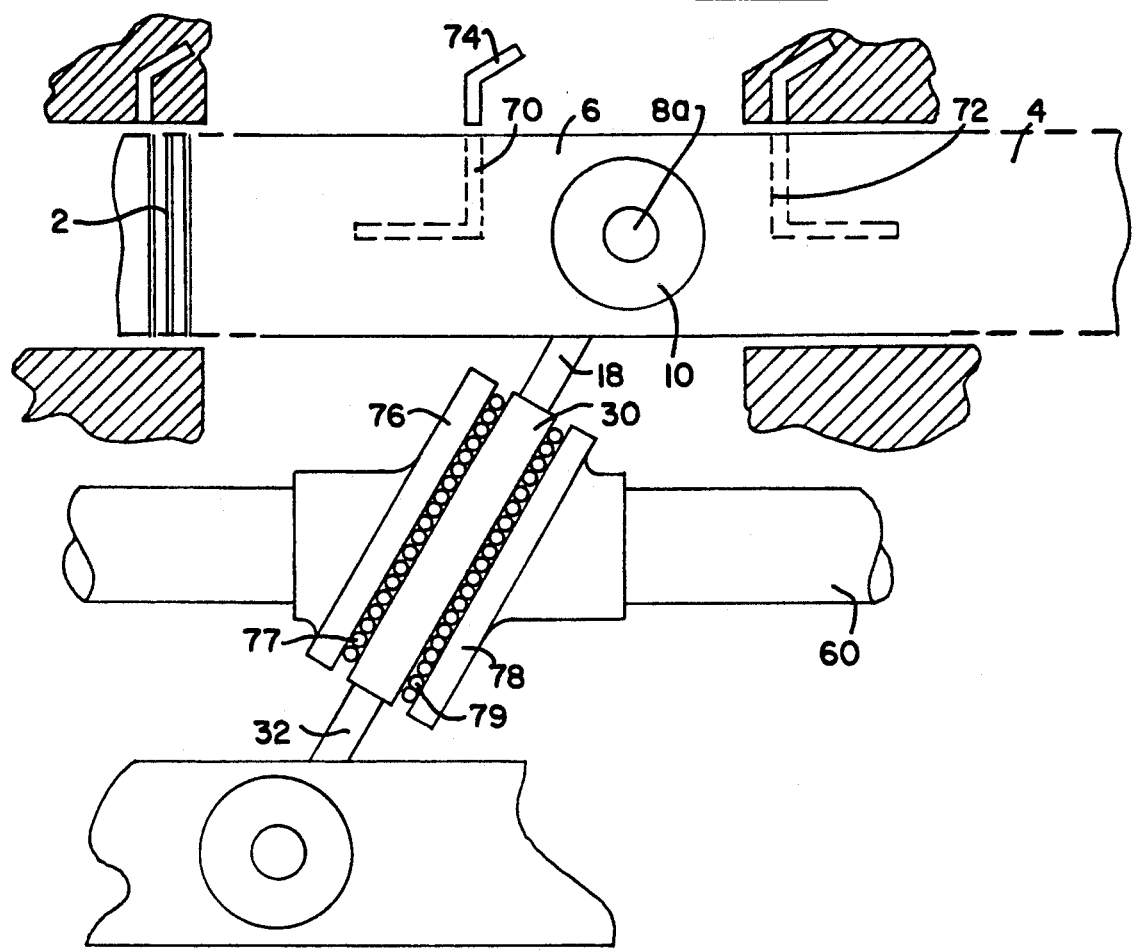
FIG. 1 shows a general schematic arrangement of one embodiment to co-operate with up to four pistons.

As can be seen from FIG. 1, linear motion of two pistons 2 and 4 (shown only by dotted lines) drives the rigid member 6 right and left as viewed in this figure. These pistons 2 and 4 may be pistons of a steam engine or of an internal combustion engine. The small rotary cylinder 8 is mounted on bearings 10 and 12 (FIG. 3) in this rigid member 6 by means of projections 8a. The rotary cylinder 8 has bored hole 14 (FIG. 3) at right angles to its center line. In this hole 14 is located a ball bearing 16 that permits the arm 18 to move axially and rotate. This bearing 16 can be a commercial bearing such as is manufactured by the Linear Rotary Bearings, Inc. of 59 New York Avenue, Westbury, N.Y. 11590. Another and more compact bearing design can be made as shown in section of FIG. 9 where a sleeve 20 holds a large number of steel balls 22 located firmly between arm 18 and the cylindrical member 8. This type of bearing permits the balls to roll between the arm 18 and the central bore 24 (FIG. 9) when the arm 18 moves axially and/or rotates. The sleeve 20 is prevented from moving out of its correct location by shoulders 26 and/or rings 28 located either in the member 8 or in the arm 18.

The drive plate 30 is provided with two arms 18 and 32 (FIG. 1). They are located 180° apart and serve to wobble the drive plate 30 when acted upon by one or more pistons at 2 or 4.

If eight opposed double pistons are to be used, or four pistons are to be used driving only from one end of the engine (that is either left or right as viewed in FIG. 1) a single drive plate 30 can not be used. The dotted circle 40 in FIG. 7 shows the location of an arm that would be needed for a pair of opposed pistons (or for one piston) located at 90° from the other pistons 2 or 4. The motion of a possible arm at this location 40 would not be perfectly linear but would execute a rather flat figure "8" as shown by the dotted line 34.

Figures 4, 4A:
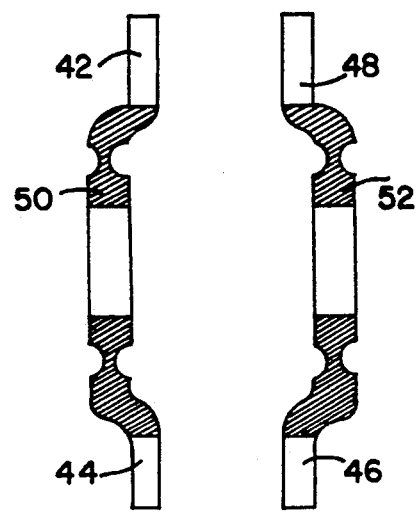
FIG. 4 shows the side section view of a driving plate for another embodiment of my invention.
FIG. 4A shows the side section view of another driving plate for the embodiment of my invention referred to in FIG. 4.

To avoid this difficultly, prior inventors have resorted to the use of connecting rods or loose fits between some machine members as was discussed in reference to the background of the invention. To solve the problem of obtaining true linear motion of the four driving arms 42, 44, 46 and 48 I use two driving plates 50 and 52 as shown in FIG. 6. Each plate has two driving arms as shown in FIGS. 4 and 4A but the arms are offset relative to the central plane of each plate 50 and 52 (FIG. 6). This is necessary so that when the two plates 50 and 52 are mounted between the two swash plates 54 and 56 the four driving arms 42, 44, 46 and 48 lie in one plane. The final result is that all of the driving pistons and their connecting members like 6 in FIG. 1 and 54 in FIG. 2 move in straight lines and the driving plates 52 and 50 do not rotate and need no special elements to keep them from rotating.

To clarify the above discussion it should be pointed out that I show only two arms 18 and 32 in FIGS. 1 and 2. In FIG. 6, there would be four such arms, two extending from drive plate 50 for engaging two opposing pistons and two extending from drive plate 52 for engaging two or more opposing pistons. The reason that these things are not disclosed in FIG. 6 because it would be confusing, in FIG. 6, to show all four pistons and all four arms.

Figure 3:
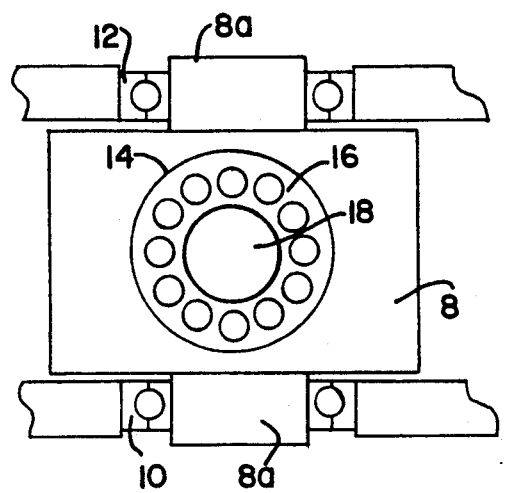
FIG. 3 shows the top view of the means to operate the derive plate of FIG. 2.

I should repeat at this point of what is meant by motion in a straight line. While all of the pistons move the assemblies 6 and 54 in straight lines, the driving arms 18 and 32 (FIG. 1) and 42, 44, 46 and 48 (FIGS. 4, 4A and 6) move in arcs that lie in planes that pass thru the central axis of the shafts 60 and 61. It is this arc motion of the arms 18 and 32 that requires them to have linear freedom in the bearings 16 (FIG. 3) or 62 (FIG. 2) of component 8 (FIG. 2 or FIG. 3).

It should also be noted that while I show how all of the bearings of my mechanism can use low friction bearings this has no relation to the friction of pistons against their cylinders. That friction depends on the design of the engine and whether my mechanism is used for a pump, and whether it is pumping oil or gas. While I show in FIG. 1, 2 and 6 ball bearings 77 and 79 that are built directly into the swash plates 30 and the driving plate or plates 50 and 52, it should be understood that conventional ball bearings 81 and 83 between swash plates 76a and 78a and driving plate 30a can be used with their own races 25 shown in FIG. 5. While I show ball bearings between all of the swash plates and the driving plate or plates, and at 10 and 12 in FIG. 3, it should be understood that other anti-friction bearings, like roller bearings can be used in these locations. Such roller bearings would be particularly suitable for very large machines.

It is possible to dispense with ball bearings and use sleeve bearings at the driving arms 18, 32, 42, 44, 46 and 48 in an oil pump or a small engine built for very light duty and limited life.

Swash plate engines have suffered from wear problems, and the matter of lubrication is most important. One possible method of lubricating my mechanism is shown schematically in FIG. 1. Oil under pressure is fed by nozzle 74 to the top as seen in FIG. 1, and as the element 6 moves right and left, the oil is fed into passages or ducts 70 and 72 to be fed to the cylinder surfaces. When the pistons 2 and 4 are in mid position, the oil is squirted into the passage occupied by the arm 18. From here it flows to the top of the swash plate assembly at the center of my mechanism.

Similar oil jets must be positioned at other simetrical locations of the mechanism to lubricate other pistons, cylinders and bearings.

FIG. 2 shows the possible design of the swash plates 76 and 78 by using two key-ways cut into the hub 82 of each plate, the two opposed swash plates 76 and 78 can be made identical. One or two keys 84 and 86 can then be used with keyways 88 and 90 cut into the shaft 60.

Swash plates, in general, in their simplest form are inherently not balanced dynamically because of their angular position on a shaft on which they are mounted. Because in my design, only one side of each plate (76 in FIG. 8) is actually used, counter-balancing weight 92 can be built into the outside 94 of each swash plate as shown in FIG. 8. This permits the dynamic balancing of each plate.

I have explained how the invention may be applied to covert linear motion to rotary motion. The same mechanism may be used to convert rotary to linear motion by having an engine and a motor rotate the shaft of any machines hereinabove described. In such case the drive plate drives the load.

It may be desirable to include a flywheel driven by the shaft in these cases where the driving piston (or pistons) applies intermittent motion to any driving plate. This would be the case, for example, where my mechanism is used in a single-cylinder engine.

My swash plate mechanism is designed to operate with pistons or other that move in straight lines. However, it must be understood that it is impossible to construct machines, shafts and bearings that are geometrically perfect. It is for this reason that I claim a machine that operates with substantially linear motion.

In the foregoing specification and in the following claims I often refer to anti-friction bearings. I use this term in the present commonly accepted manner to mean a bearing that uses rolling elements like balls, cones, or cylinders between mating parts. The choice depends on loads, the space available, the nature of the load as to whether it is radial or thrust, rotary or linear or combined motions, and always at cost.

The past history of the many attempts to develop a satisfactory swash plate in internal combustion engine testifies the importance of friction and wear when the bearing problems were not adequately addressed.

I claim to have invented:

1. A device for converting one of linear or rotary motion into the other of said forms of motion, comprising:

first and second spaced-apart swash members,
first means for mounting said members for rotary motion,
second means positioned in the space between said members, for engaging said swash members, and mounted for movement with linear motion,
said swash members on the one hand and said second means on the other hand comprising means for transmitting a force applied to one of them to the other,
additional means mounted for linear motion, and
anti-friction means, that interconnects said second means and said additional means, for reducing friction between the second means and the additional means during the transmission of forces between them,
wherein said anti-friction means comprises ball bearings interposed between said second means and said additional means.

2. A device as defined in claim 1 in which said second means comprises a drive plate and a projection extending away from said drive plate,
said ball bearings being mounted on and carried by said projection.

3. A device for converting a first form of motion into a second form of motion, comprising:
first and second spaced-apart swash members,
first means for mounting said members for allowing one of said forms of motion,
second means positioned in the space between said members, for engaging said swash members, and mounted for movement in accordance with another of said forms of motion,
said swash members on the one hand and said second means on the other hand comprising means for transmitting a force applied to one of them to the other,
said second means comprising two elements mounted between said members, said elements and members transmitting forces from one to the other.

4. A device as defined in claim 3 comprising bearing means for minimizing friction during the transmission of forces from said elements on the one hand and said members on the other hand.

5. A device as defined in claim 4 in which said elements are plates and said members are swash plates.

6. A device as defined in claim 5 having anti-friction bearings positioned in contact with one of said elements and one of said swash plates and additional ball bearings positioned in contact with the other one of said elements and the other one of said swash plates.

7. A device as defined in claim 3 in which said second means includes ball bearings separating said two elements.

8. A device for converting one form of motion into another form of motion, comprising:
first means comprising a shaft that has an axis and is mounted for rotation about its axis,
second means comprising first and second spaced apart swash members mounted on and rotatable with said shaft, and
third means mounted between said swash members for motion without substantial rotary motion relative to said shaft, and having power transmission means associated with said third means and each of said first and second swash members for a smooth transmission of power between said second and third means,
said third means comprising two adjacent elements both mounted for wobble motion without substantial rotary motion.

9. A device as defined in claim 8 having anti-friction bearings between said elements to minimize friction between said elements when thee is relative rotation between these elements.

10. A device as defined in claim 8 in which there are two sets of anti-friction bearings, with one such set being associated with one of said elements for minimizing friction between such one element, and one of said swash members and the other such set being associated with the other element and the other swash member.

11. The mechanism as defined in claim 8 where the said third means comprises two plates each provided with two arm members spaced 180 degrees apart, said arms arranged to be driven by plural members moving in straight lines parallel to said shaft, and where the four arms, two from each plate, all lie in a single plane located half way between the two swash plates.

12. A device as defined in claim 8 in which said third means includes anti-friction means positioned between said two adjacent elements.

13. A device as defined in claim 12 in which said anti-friction means comprises ball bearings.

* * * * *